(12) United States Patent
Sheu et al.

(10) Patent No.: US 11,119,959 B2
(45) Date of Patent: Sep. 14, 2021

(54) DATA COMMUNICATION AND PROCESSING METHOD OF MASTER DEVICE AND SLAVE DEVICE

(71) Applicant: Realtek Semiconductor Corp., HsinChu (TW)

(72) Inventors: Jeong-Fa Sheu, Taoyuan (TW); Sheng-Pin Lin, Changhua County (TW); Han-Yi Hung, Hsinchu (TW); Chien-Wei Lee, Taichung (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/776,525

(22) Filed: Jan. 30, 2020

(65) Prior Publication Data

US 2020/0257641 A1 Aug. 13, 2020

(30) Foreign Application Priority Data

Feb. 13, 2019 (TW) ................. 108104787

(51) Int. Cl.
*G06F 13/362* (2006.01)
*G06F 13/28* (2006.01)
*G06F 13/40* (2006.01)
*G06F 13/38* (2006.01)

(52) U.S. Cl.
CPC ............ *G06F 13/362* (2013.01); *G06F 13/28* (2013.01); *G06F 13/385* (2013.01); *G06F 13/4004* (2013.01)

(58) Field of Classification Search
CPC ...... G06F 13/362; G06F 13/28; G06F 13/385; G06F 13/4004
See application file for complete search history.

(56) References Cited

U.S. PATENT DOCUMENTS 5,710,939 A * 1/1998 Ballachino ............ G06F 13/385
710/1
6,219,724 B1 * 4/2001 Kim ........................ G06F 13/28
710/22

(Continued)

FOREIGN PATENT DOCUMENTS

CN 102238055 B 5/2015
CN 104811273 A 7/2015

(Continued)

OTHER PUBLICATIONS

Kurose & Ross, Computer Network: A Top-Down Approach(5th Edition,2010), pp. 218-219, 450-453, 462-463, 2010.

(Continued)

*Primary Examiner* — Henry Tsai
*Assistant Examiner* — Aurangzeb Hassan
(74) *Attorney, Agent, or Firm* — Winston Hsu

(57) ABSTRACT

A data communication and processing method of a master device and a slave device is provided, wherein the method includes the steps of: using the master device to transmit a frame to the slave device via a communication medium, wherein the frame includes a plurality of fields, the plurality of fields includes a bursting size field and a data field, and contents within the bursting size field indicate a data amount of the data field; and using the slave device to receive the frame and store contents of the data field, or output data to the data field according to the data amount indicated by the contents within the bursting size field of the frame. In addition, a method for replacing preamble bits with a postamble bit to improve transmission efficiency is provided.

17 Claims, 3 Drawing Sheets

(56) References Cited

U.S. PATENT DOCUMENTS

| | | | | |
|---|---|---|---|---|
| 9,432,298 | B1* | 8/2016 | Smith | H04L 49/9057 |
| 10,305,671 | B2* | 5/2019 | Kumar | G06F 13/4291 |
| 2008/0209087 | A1* | 8/2008 | Dierks | G06F 13/385 |
| | | | | 710/34 |
| 2012/0033620 | A1* | 2/2012 | Thoen | H04J 3/0697 |
| | | | | 370/329 |
| 2012/0188998 | A1* | 7/2012 | Philips | H04W 56/001 |
| | | | | 370/350 |
| 2012/0320933 | A1* | 12/2012 | Magee | H04L 12/413 |
| | | | | 370/503 |
| 2016/0191148 | A1* | 6/2016 | Harrington | H04B 7/18528 |
| | | | | 370/316 |
| 2020/0053729 | A1* | 2/2020 | Borges | H04W 74/0808 |

FOREIGN PATENT DOCUMENTS

| | | |
|---|---|---|
| TW | 200643723 | 12/2006 |
| TW | 201509166 A | 3/2015 |

OTHER PUBLICATIONS

"IEEE Standard for Ethernet", 2016, IEEE, USA.
"UM10204 I2C-bus specification and user manual", Apr. 4, 2014, NXP Semiconductor, NTL.
"IEEE Standards 802.3ae-2002", Aug. 30, 2002, IEEE, USA.
"I2C bus", Jan. 2000, Philips Semiconductors, USA.
Office action dated Jun. 28, 2021 for CN application No. 201910123925. 8, filing date: Feb. 19, 2019, pp. 1-8.

* cited by examiner

| 202 | 204 | 206 | 208 | 210 | 212 | 214 | 216 |
|---|---|---|---|---|---|---|---|
| Start field | Operation field | Bursting size field | Slave device address field | Register address field | Turnaround field | Data field | Postamble field |
| 01 | 01 | S1, S0 | A2~A0 | R4~R0 | 10 | DN~D0 | 1 |

FIG. 2

| 302 | 304 | 306 | 308 | 310 | 312 | 314 | 316 |
|---|---|---|---|---|---|---|---|
| Start field | Operation field | Bursting size field | Slave device address field | Register address field | Turnaround field | Data field | Postamble field |
| 01 | 10 | S1, S0 | A2~A0 | R4~R0 | Z0 | DN~D0 | 1 |

FIG. 3

| First frame | Second frame | Third frame | Fourth frame | ... |
|---|---|---|---|---|
| (S1, S0)=(0, 1) DN~D0: Address information 32 bits of data | (S1, S0)=(1, 1) DN~D0: 64 bits of data | (S1, S0)=(1, 1) DN~D0: 64 bits of data | (S1, S0)=(0, 1) DN~D0: 32 bits of data | ... |

DATA COMMUNICATION AND PROCESSING METHOD OF MASTER DEVICE AND SLAVE DEVICE

BACKGROUND OF THE INVENTION

1. Field of the Invention

The present invention is related to data communication, and more particularly, to a data communication and processing method of a Management Data Input/Output (MDIO) interface.

2. Description of the Prior Art

As defined in the IEEE 802.3 specification, a Management Data Input/Output (MDIO) frame has 32 bits of preamble data for determining subsequent start bit(s). As the total size of the frame is 64 bits, and valid data therein is only 16 bits, the majority of the frame contents are invalid preamble data, which severely wastes the frame and degrades data communication efficiency.

SUMMARY OF THE INVENTION

Thus, an objective of the present invention is to provide a data communication and processing method of a master device and a slave device, wherein the data amount is scalable, and there is no need to configure any preamble data, in order to effectively improve data communication efficiency.

In an embodiment of the present invention, a data communication and processing method of a master device and a slave device is disclosed. The data communication and processing method comprises the following steps: using the master device to transmit a first frame to the slave device via a communication medium, wherein the first frame comprises a plurality of fields, the plurality of fields comprise a bursting size field and a data field, and contents within the bursting size field indicate a data amount of the data field; and using the slave device to receive the first frame and store contents of the data field, or output data to be read by the master device to the data field of the first frame according to the data amount of the data field indicated by the contents within the bursting size field.

In another embodiment of the present invention, a data processing method of a slave device is disclosed. The data processing method comprises: receiving a first frame from a master device, wherein the first frame comprises a plurality of fields, the plurality of fields comprise a bursting size field and a data field, and contents within the bursting size field indicate a data amount of the data field; and according to the data amount of the data field indicated by the contents within the bursting size field, storing contents of the data field, or outputting data to be read by the master device to the data field of the first frame.

In another embodiment of the present invention, a slave device for data processing is disclosed. The slave device receives a first frame from a master device, wherein the first frame comprises a plurality of fields, the plurality of fields comprise a bursting size field and a data field, and contents within the bursting size field indicate a data amount of the data field; and according to the data amount of the data field indicated by the contents within the bursting size field, the slave device stores contents of the data field, or outputs data to be read by the master device to the data field of the first frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating a frame that is transmitted when a master device writes data into a slave device according to an embodiment of the present invention.

FIG. 3 is a diagram illustrating a frame that is transmitted when a master device reads data from a slave device according to an embodiment of the present invention.

DETAILED DESCRIPTION

Figure 1:
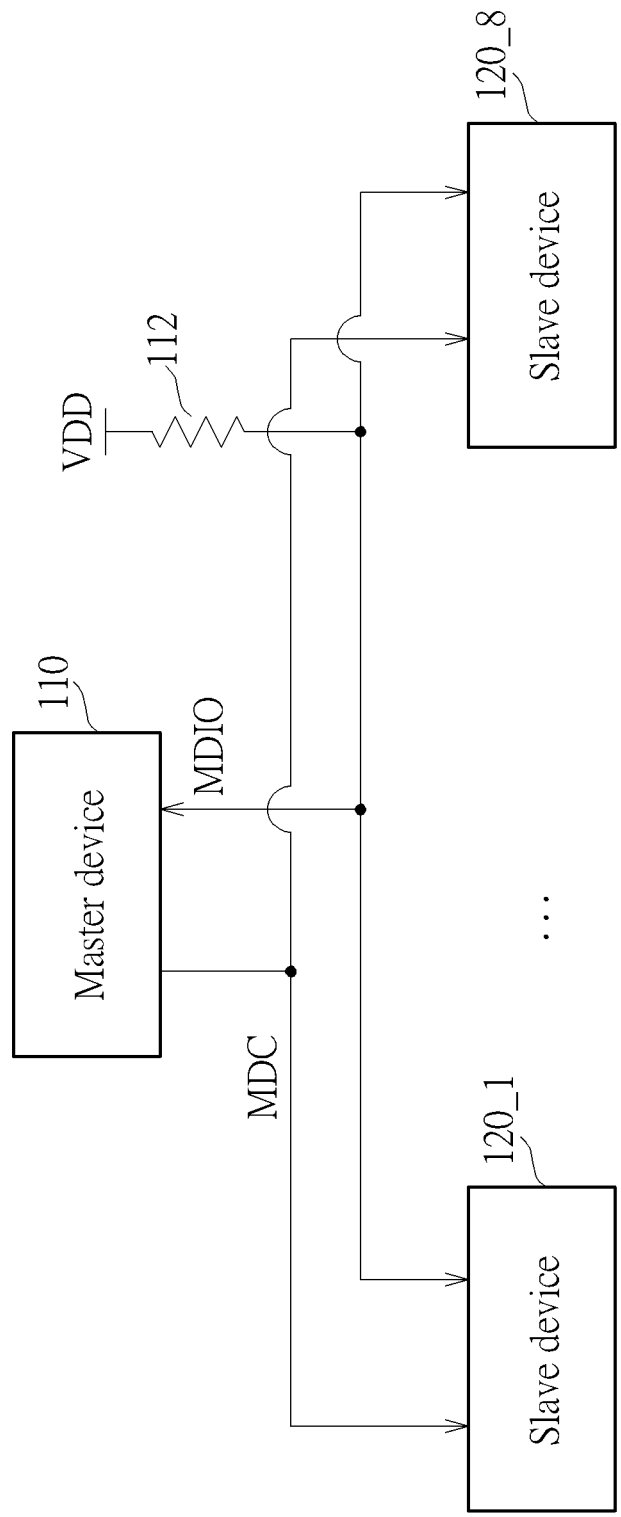
FIG. 1 is a diagram illustrating a master device and a plurality of slave devices according to an embodiment of the present invention.

FIG. 1 is a diagram illustrating a master device 110 and a plurality of slave devices according to an embodiment of the present invention, where this embodiment uses eight slave devices 120_1 to 120_8 for illustration. As shown in FIG. 1, the master device 110 may respectively communicate with the plurality of slave devices 120_1 to 120_8, where the master device 110 may transmit a clock signal MDC to the plurality of slave devices 120_1 to 120_8, and may also write data into the slave devices 120_1 to 120_8 via a Management Data Input/Output (MDIO), or read data from the slave devices 120_1 to 120_8. In this embodiment, the master device 110 may be a Media Access Control (MAC) circuit within an Ethernet network or other circuit module(s), the slave devices 120_1 to 120_8 may be physical layer circuits within the Ethernet network device or any circuit module, and the master device 110 and the slave devices 120_1 to 120_8 may be configured in a System on a Chip (SoC) or configured indifferent chips.

Additionally, a communication medium between the master device 110 and the slave device 120_1 to 120_8 is connected to a supply voltage VDD via a pull up resistor 112. When there is no data communication between the master device 110 and the slave devices 120_1 to 120_8, a voltage level of the communication medium may be gradually pulled up to the supply voltage VDD in order to avoid leakage problems between the master device 110 and the slave device 120_1 to 120_8.

FIG. 2 is a diagram illustrating a frame 200 that is transmitted when the master device 110 writes data into a slave device according to an embodiment of the present invention, where the following description takes the slave device 120_1 as an example. The slave device comprises a storage element which has registers respectively corresponding to multiple addresses. As shown in FIG. 2, the frame 200 comprises a start field (ST) 202, an operation field (OP) 204, a bursting size field 206, a slave device address field (SLAVEAD) 208, a register address field (REGAD) 210, a turnaround field (TA) 212, a data field (DATA) 214 and a postamble field 216. In this embodiment, the start field 202 is for the slave device 120_1 to determine whether the frame 200 is started; the start field 202 serves as a first field of the frame 200, i.e. there is no preamble bit before the start field 202, and the start field 202 is two bits "0", "1". The operation field 204 is configured to indicate operations of the master device 110 regarding the slave device 120_1. For example, if two bits of the operations field 204 are "0", "1" sequentially, this means the master device 110 is going to write data into the slave device 120_1; and if the two bits of the operations field 204 are "1", "0" sequentially, this means the master device is going to read data from the slave device 120_1. The bursting size field 206 is configured to indicate a data amount of the data field 214 by indicating one of a plurality of default data amounts. In this embodiment, the bursting size field 206 has two bits S1, S0. The data amount of the data field 214 is 16 bits when S1, S0 are "0" and "0" respectively, the data amount of the data field 214 is 32 bits when S1, S0 are "0" and "1" respectively, the data amount of the data field 214 is 48 bits when S1, S0 are "1" and "0" respectively, and the data amount of the data field 214 is 64 bits when S1, S0 are "1" and "1" respectively. This embodiment assumes that the maximum number of the slave devices is eight, so the slave device address field 208 comprises three bits A0 to A2, and is configured to indicate to which of the slave devices 120_1 to 120_8 the data within the frame 200 is transmitted. The register address field 210 comprises five bits R4 to R0, and is configured to indicate an address of a set of registers within the slave device (since the register address field in this embodiment has five bits, it can supports 32 sets of registers). The turnaround field 212 comprises two bits, and serves as buffer cycles that avoid signal conflict when switching to use the slave device 210_1 to transmit data to the master device 110. The data field 214 comprises data having a plurality of bits DN to D0, where the data amount of the data field 214 is set by the bursting size field 206. The postable field 216 comprises at least one postamble bit, where a level corresponding to the aforementioned at least one postamble bit is identical to a level of the communication medium when the master device and the slave device enter an idle state; therefore, the postamble bit in this embodiment is "1" (a high voltage level, or a voltage level of the supply voltage VDD).

Since the communication medium has the high voltage level (the logic "1") at idle state, when the slave device 120_1 detects the voltage level of the communication medium changes from high to low and returns to high afterwards, the slave device 120_1 may determine that the two bits of the start field 202 of the frame 200 are "0", "1" in order to start subsequent operations. Since the two bits of the operation field 204 are "0", "1" sequentially, the slave device 120_1 may determine that the frame 200 carries write data from the master device 110. According to contents within the bursting size field 206, the slave device 120_1 then knows the data amount of the data field 214 for reference by subsequent data capture operations. Then, according to the slave device address field 208, the slave device 120_1 determines this data is transmitted to it (i.e. to the slave device 120_1) and decodes the register address field 210 to select a set of registers therein. Since the operation field 204 indicates a write frame, which means there is no need to exchange the transmitting side and the turnaround field 212 is not needed, the slave device 120_1 stores the data within the data field 214 into a register corresponding to the register address field 210. If the slave device 120_1 determines that this data is transmitted to other devices according to the slave device address field 208, the slave device 120_1 may omit the frame 200.

In this embodiment, since a time interval for the master device 110 transmitting frames is not fixed and the frame 200 does not have any preamble bits before the start field 202, the postamble field of the frame 200 outputs the bit "1" to precharge the communication medium and pull it up to the high voltage level, which can make the slave device precisely determine the two bits of the start field of a next frame. This prevents a problem where the communication medium cannot be pulled up to the supply voltage VDD via the pull up resistor 112 in time because the time interval between frames is too short. Regarding the frame 200, the operation of the postamble field 216 outputting "1" to a MDIO bus for precharging is performed by the master device 110.

As mentioned above, since the frame 200 saves/omits 32 preamble bits of a conventional frame, data (i.e. the data field 214) carried by the frame can be transmitted more effectively.

FIG. 3 is a diagram illustrating the master device 110 reading data from a slave device according to an embodiment of the present invention, where the following description takes the slave device 120_1 as an example. In the embodiment of FIG. 3, the master device 110 may transmit the start field 302, the operation field 304, the bursting size field 306, the slave device address field 308 and the register address field 310 of a frame 300 to the slave device 120_1 only. When the slave device 120_1 detects the voltage level of the communication medium changes from high to low and returns to high afterwards, the slave device 120_1 may determine two bits "0", "1" of the start field 302 of the frame 300 in order to start subsequent operations. Since two bits of the operation field 304 are "1", "0" sequentially, the slave device 120_1 may determine the master device is requesting to read data, meaning the frame 300 is a read frame. According to contents within the bursting size field 306, the slave device 120_1 then knows a data amount that needs to be further transmitted to the master device 110 for reference by a subsequent data select operation. According to the slave device address field 308, the slave device 120_1 determines that this frame is transmitted to itself and decodes the register address field 310 to select a set of registers. A first bit "Z" (high impedance) of a turnaround field 312 follows, which means all devices should not output voltages to the MIDO during this period of the clock signal MDC in order to allow the slave device 120_1 to prepare for transmitting a data electric signal to the master device 110 afterwards. This arrangement can prevent the master device 110 and the slave device 120_1 from concurrently transmitting electric signals to the MDIO, which might cause signal conflict thereby damaging the device (e.g. reducing the lifetime thereof). Refer again to FIG. 1. During a period that respective devices are maintained in a high impedance state, the pull up resistor can slowly pull up voltage levels on the MDIO in order to prevent respective devices connected with the MDIO from leakage. Before the turnaround field 312, the electric signals are driven to the MDIO bus by the master device 110; in a second bit of the turnaround field 312 and the following data field 314 and postamble bit 316, the electric signals are driven to the MDIO bus by the slave device 120_1. The slave device 120_1 then reads register data corresponding to the register address field 310 and then put the register data into the data field 314 which is transmitted to the master device 110, and finally the slave device 120_1 transmits the postamble bit 316 to output bit "1" to the MDIO bus, in order to rapidly pull up a voltage level of a high speed communication medium within a clock period. A MDIO terminal on the slave device 120_1 may remain in the high impedance state, and no longer output the electric signals to the MDIO bus. At this point, no device outputs electric signals to the MDIO; the MDIO bus can be kept in the high level state (i.e. an idle state) by the pull up resistor 112 until the master device 110 sends a new frame. By replacing a lengthy preamble field in the related art with this one bit postamble field, the present invention can improve communication performance.

Each frame transmitted by the master device 110 can be arbitrarily assigned a data amount (i.e. a data length) carried by this frame through the bursting size field 206/306, and this arrangement can further improve communication efficiency and enhance flexibility of usage.

Although the aforementioned embodiments are illustrated based on the slave device 120_1, a similar operating concept can be applied to other slave devices 120_2 to 120_8, and the number of slave devices is not limited to eight. Additionally, each of the bursting size fields 206/306 has only two bits in this embodiment, but the present invention is not limited thereto, and the number of bits may be increased or reduced according to different applications. Those skilled in this art should understand detailed implementations thereof, and related descriptions are omitted here for brevity.

Figures 4, 5:
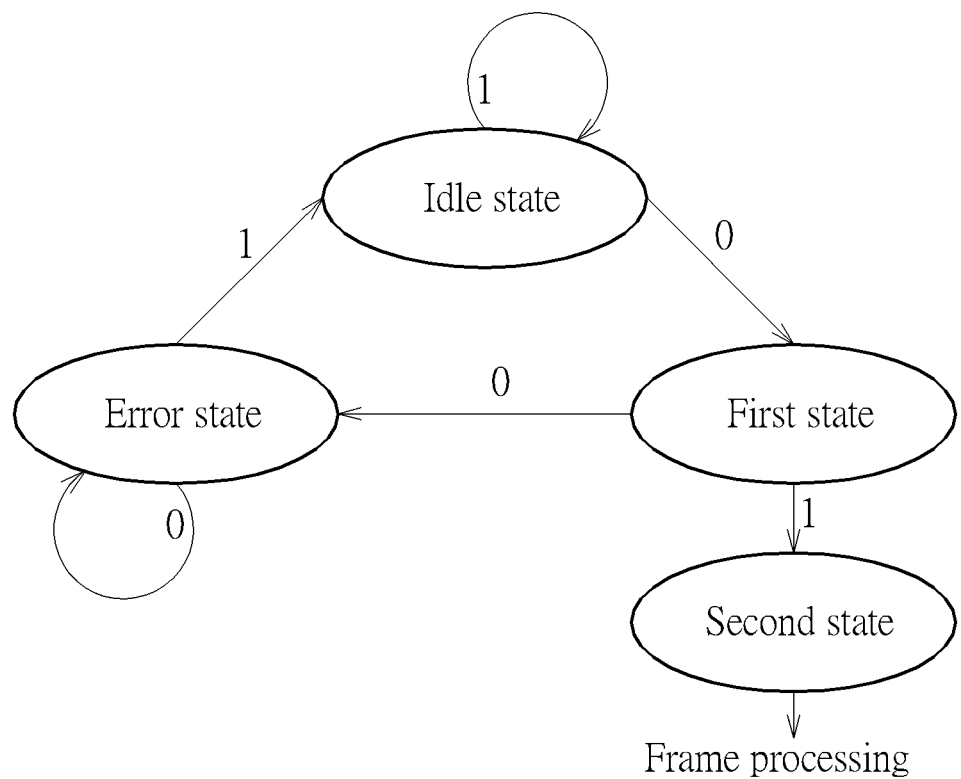
FIG. 4 is a diagram illustrating a finite state machine in a slave device.
FIG. 5 is a diagram illustrating a plurality of frames used by a master device to perform continuous write or continuous read operations on a slave device.

In order to avoid detection error of a start bit, the slave device 120_1 may have a finite state machine shown in FIG. 4. In the idle state, when the slave device 120_1 detects that the communication medium is at the high level (i.e. logic "1"), the slave device 120_1 may be kept in the idle state, and if the slave device 120_1 detects that the communication medium changes to the low voltage level (i.e. logic "0"), the slave device 120_1 may enter a first state. After entering the first state, if the slave device 120_1 detects that the communication medium has the logic "1", it means two start bits of a frame are received, and the slave device 120_1 thereby enters a second state for processing subsequent fields of the frame; if the slave device 120_1 detects that the communication medium has the logic "0", it means there is a start bit error, and the slave device 120_1 thereby enters an error state. After entering the error state, if the slave device 120_1 detects the communication medium has the logic "1", the slave device 120_1 will return to the idle state and wait for detecting start bits of the next frame.

In another embodiment of the present invention, the master device 110 supports a post write increment address access function (a continuous write function) in the process of transmitting frame to the slave device 120_1; data carried by different frames may be different. More specifically, referring to FIG. 5, the master device 110 may transmit a first frame to a certain post write increment address access register of the slave device 120_1 to enable the post write increment address access function, where two bits S1, S0 of the bursting size field of the first frame are "0", "1" respectively. This indicates that there are 32 bits of data stored in the data field and these 32 bits of data are configured to indicate a register address within the slave device 120_1. Then, the master device 110 transmits a second frame to the slave device 120_1, where the two bits S1, S0 of the bursting size field of the second frame are "1", "1" respectively. This indicates that there are 64 bits of data stored in the data field, and these 64 bits data may be directly stored into the register indicated by the first frame. Then, the master device 110 transmits a third frame to the slave device 120_1, where the two bits S1, S0 of the bursting size field of the third frame are "1", "1" respectively. This indicates that there are 64 bits of data stored in the data field, and these 64 bits of data may be directly stored into a register following the aforementioned register address. Note that, the first frame, the second frame and the third frame are continuous frames, and the continuous frames can be further increased. Similarly, the master device 110 transmits a fourth frame to the slave device 120_1, where the two bits S1, S0 of the bursting size field of the fourth frame are "0", "1" respectively. This indicates that there are 32 bits of data stored in the data field, and these 32 bits of data may be directly stored into a register of a next register address, where the rest may be induced by analogy. When the post write increment address access function is to be disabled, the master device 110 may output a write frame to a certain register within the slave device 120_1, which is defined as a stopping post write increment address access (stopping continuous write), to notify the slave device 120_1 to stop post write increment address access (to stop continuously writing). The slave device 120_1 may then work in a normal way that operates frame by frame.

In another embodiment of the present invention, the master device 110 supports a post read increment address access function (a continuous read function) in the process of transmitting frame to the slave device 120_1; data carried by different frames may be different. Taking FIG. 5 as an example, the master device 110 may transmit a first frame to a certain post read increment address access register of the slave device 120_1 to enable the post read increment address access function, where two bits S1, S0 of the bursting size field of the first frame are "0", "1" respectively. This indicates that there are 32 bits of data stored in the data field, and these 32 bits of data are configured to indicate a register address within the slave device 120_1. Then, the master device 110 transmits a second frame to the slave device 120_1, where the two bits S1, S0 of the bursting size field of the second frame are "1", "1" respectively. This indicates that there are 64 bits of data stored in the data field, and the slave device 120_1 transmits these 64 bits of data stored in the register indicated by the first frame to the master device 110. Then, the master device 110 transmits a third frame to the slave device 120_1, where the two bits S1, S0 of the bursting size field of the third frame are "1", "1" respectively, and the slave device 120_1 transmits the 64 bits of data following the aforementioned register address data to the master device 110. Note that, the first frame, the second frame and the third frame are continuous frames, and the continuous frames can be further increased. Similarly, the master device 110 transmits a fourth frame to the slave device 120_1, where the two bits S1, S0 of the bursting size field of the fourth frame are "0", "1" respectively, and the slave device 120_1 transmits the 32 bits of data stored in a next register to the master device 110, where the rest may be induced by analogy. When the post read increment address access function is to be disabled, the master device 110 may output a write frame to a certain register within the slave device 120_1, which is defined as a stopping post read increment address access (stopping continuous read), to notify the slave device 120_1 to stop post read increment address access (to stop continuously reading). The slave device 120_1 may then work in a normal way that operates frame by frame.

Additionally, the architecture in the embodiments above may be compatible with the IEEE 802.3 specification. If the master device 110 controls two consecutive frames to be interleaved with at least 32 clock periods in order to simulate 32 preamble bits and concurrently sets two bits of the bursting size fields 206/306 shown in FIGS. 2 and 3 as "0", the two bits of the bursting size fields 206/306 in conjunction with the slave device address fields 208/308 may be regarded as five bits slave device address in the IEEE 802.3 specification, so the applications thereof can be more flexible.

Briefly summarized, in the data communication and processing method based on MDIO, data communication can be more efficient by omitting preamble bits of a frame and using the bursting size field to set the data amount of a data field. Additionally, the problem where the communication medium cannot be pulled up to the supply voltage via a resistor in time because the time interval between frames is too short can be avoided by configuring the postamble bits to precharge the communication medium, in order to determine the start bits more precisely. Additionally, by utilizing the finite state machine, the start bits of a frame can be effectively detected, and the subsequent fields may be read and processed after determining correct start bits, in order to avoid error operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data communication and processing method of a master device and a slave device, comprising: using the master device to transmit a first frame to the slave device Via a communication medium, wherein the first frame comprises a plurality of fields, the plurality of fields comprise a bursting size field and a data field, and contents within the bursting size field indicate a data amount of the data field and using the slave device to receive the first frame and store contents of the data field, or output data to be read by the master device to the data field of the first frame according to the data amount of the data field indicated by the contents within the bursting size field, wherein a first field of the plurality of fields is a start field, and there is no preamble bit before the start field of the first frame, wherein a last field of the plurality of fields is a postamble field, the postamble field has at least one postamble bit, and a level corresponding to said at least one postamble bits identical to a level on the communication medium when the master device and the slave device enter an idle state.

2. The data communication and processing method of claim 1, wherein the data field is capable of being set to have one of a plurality of default data amounts, and the bursting size field is configured to indicate a default data amount corresponding to the data field.

3. The data communication and processing method of claim 1, wherein a bit value of a first bit of the start field is different from a bit value of said at least one postamble bit.

4. The data communication and processing method of claim 3, wherein said at least one postamble bit is a last bit of the first frame, and the first bit of the start field is a first bit of the first frame.

5. The data communication and processing method of claim 1, further comprising:
using the slave device to obtain address information of a storage element of the slave device from the data field;
using the master device to transmit a second frame to the slave device via the communication medium;
using the slave device to receive the second frame and obtain data from a data field of the second frame; and
writing the data into the storage element according to the address information.

6. The data communication and processing method of claim 5, further comprising:
using the master device to transmit a third frame to the slave device via the communication medium;
using the slave device to receive the third frame and obtain another data from a data field of the third frame; and
writing the other data into the storage element at an address following the address information; wherein the first frame, the second frame and the third frame are continuous frames.

7. The data communication and processing method of claim 1, further comprising:
using the slave device to obtain address information of a storage element of the slave device from the data field of the first frame;
using the slave device to read data located at the address information; and
using the master device to transmit a second frame to the slave device via the communication medium, and using the slave device to output the data to a data field of the second frame.

8. The data communication and processing method of claim 7, further comprising:
using the slave device to read other data located at an address following the address information; and
using the master device to transmit a third frame to the slave device via the communication medium, and using the slave device to output the other data to a data field of the third frame; wherein the first frame, the second frame and the third frame are continuous frames.

9. The data communication and processing method of claim 1, wherein a first field of the plurality of fields is a start field comprising a plurality of start bits, and the slave device determines whether the plurality of start bits are received, wherein the slave device determines that the first frame is received after determining that the plurality of start bits are correctly received; where the first frame is omitted if the plurality of start bits are not all correctly received.

10. A data processing method of a slave device, comprising:
receiving a first frame from a master device, wherein the first frame comprises a plurality of fields, the plurality of fields comprise a bursting size field and a data field, and contents within the bursting size field indicate a data amount of the data field;
according to the data amount of the data field indicated by the contents within the bursting size field, storing contents of the data field, or outputting data to be read by the master device to the data field of the first frame;
wherein a first field of the plurality of fields is a start field comprising a plurality of start bits, and the step of receiving the first frame from the master device comprises:
determining whether the plurality of start bits are received, and determining that the first frame is received after determining that the plurality of start bits are correctly received; where the first frame is omitted if the plurality of start bits are not all correctly received.

11. The data processing method of claim 10, wherein the data field is capable of being set to have one of a plurality of default data amounts, and the bursting size field is configured to indicate a default data amount corresponding to the data field.

12. The data processing method of claim 10, further comprising:
obtaining address information of a storage element of the slave device from the data field;
receiving a second frame from the master device;
obtaining data from a data field of the second frame; and writing the data into the storage element according to the address information.

13. The data processing method of claim 12, further comprising:
receiving a third frame from the master device;
obtaining other data from a data field of the third frame; and
writing the other data into the storage element at an address following the address information of the data; wherein the first frame, the second frame and the third frame are continuous frames.

14. The data processing method of claim 10, further comprising:
obtaining address information of a storage element of the slave device from the data field;
using the slave device to read data located at the address information;
receiving a second frame from the master device; and
using the slave device to output the data to a data field of the second frame.

15. The data processing method of claim 14, further comprising:
using the slave device to read other data located at an address following the address information;
receiving a third frame from the master device; and
using the slave device to output the other data to a data field of the third frame.

16. The data processing method of claim 15, wherein the first frame, the second frame and the third frame are continuous frames.

17. A slave device for data processing, comprising, receiving a first frame from a master device via a communication medium, wherein the first frame comprises a plurality of fields, the plurality of fields comprise a bursting size field and a data field, and contents within the bursting size field indicate a data amount of the data field; and according to the data amount of the data field indicated by the contents within the bursting size field, storing contents of the data field, or outputting data to be read by the master device to the data field of the first frame; wherein a first field of the plurality of fields is a start field, and there is no preamble bit before the start field of the first frame, wherein a last field of the plurality of fields is a postamble field, the postamble field has at least one postamble bit, and a level corresponding to said at least one postamble bit is identical to a level on the communication medium when the master device and the slave device enter an idle state.

* * * * *